United States Patent [19]

Weideman et al.

[11] Patent Number: 5,693,303
[45] Date of Patent: Dec. 2, 1997

[54] METHOD FOR THE PRODUCTION OF A CALCIUM PHOSPHATE PRODUCT

[75] Inventors: Werner Jacobus Weideman; Albertus Hermias Cornelius Van Zyl, both of Christiana, South Africa

[73] Assignee: S A Feed Phosphates CC, Christiana, South Africa

[21] Appl. No.: 515,664

[22] Filed: Aug. 16, 1995

[30] Foreign Application Priority Data

Aug. 18, 1994 [ZA] South Africa .......................... 94/6263

[51] Int. Cl.[6] .................................................. C01B 25/32
[52] U.S. Cl. ..................... 423/308; 423/309; 423/311; 426/74; 426/471; 426/807
[58] Field of Search .......................... 423/309, 311, 423/308; 426/74, 807, 471

[56] References Cited

U.S. PATENT DOCUMENTS

| | | |
|---|---|---|
| 3,085,048 | 4/1963 | Bush . |
| 3,961,081 | 6/1976 | McKenzie .................. 426/471 |
| 4,027,043 | 5/1977 | Schroeder et al. .......... 426/69 |
| 4,252,831 | 2/1981 | Glecker et al. . |
| 4,431,675 | 2/1984 | Schroeder et al. . |
| 4,731,249 | 3/1988 | Findley . |
| 4,800,092 | 1/1989 | Miller . |
| 4,897,250 | 1/1990 | Sumita . |
| 4,994,282 | 2/1991 | Miller . |
| 5,072,388 | 12/1991 | Miller . |

FOREIGN PATENT DOCUMENTS 1 275 280  5/1972  United Kingdom .

Primary Examiner—Wayne Langel
Attorney, Agent, or Firm—Kenyon & Kenyon

[57] ABSTRACT

A method for the production of condensed molasses solubles-enriched calcium phosphate includes the step of reacting, in an exothermic reaction, a predetermined amount of a calcium oxide-containing product with a predetermined amount of an aqueous solution of phosphoric acid and a predetermined amount of condensed molasses solubles to produce a reaction mixture containing calcium phosphate and condensed molasses solubles. The method, further, includes allowing the heat produced in the exothermic reaction to evaporate at least a part of the water present in the reaction mixture. The condensed molasses solubles-enriched calcium phosphate product is isolated in loose granular form and has a water content of 0–15% (mass/mass).

17 Claims, 1 Drawing Sheet

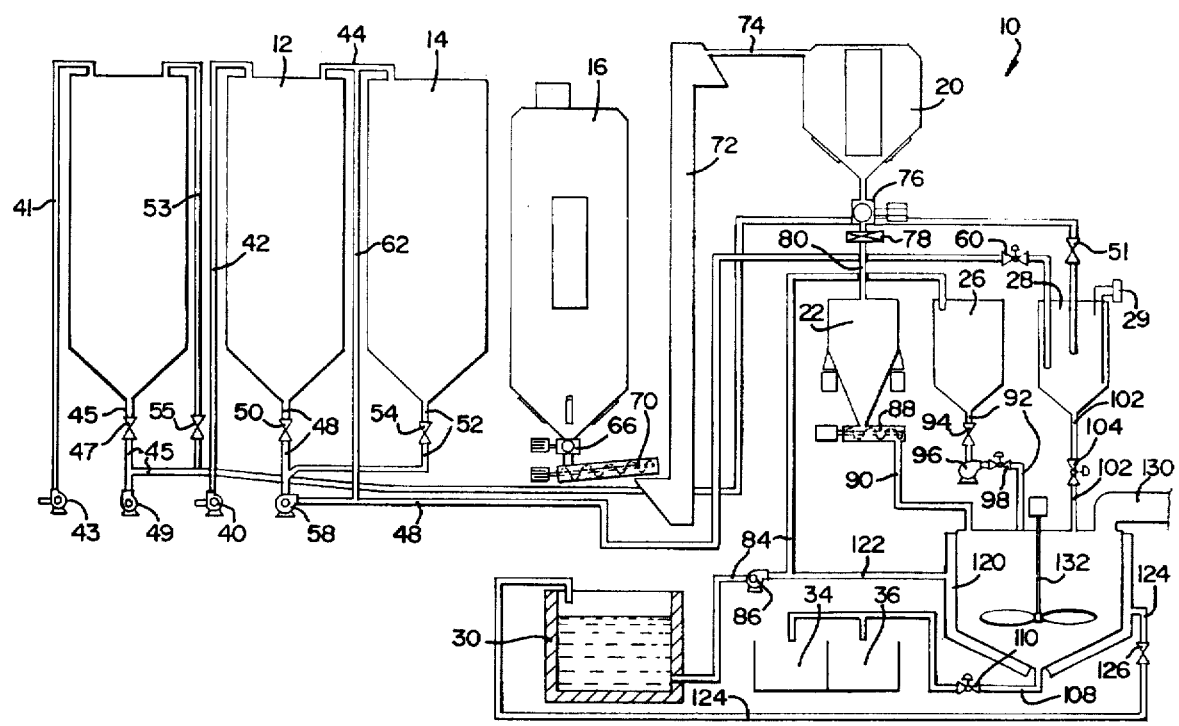

METHOD FOR THE PRODUCTION OF A CALCIUM PHOSPHATE PRODUCT

This invention relates to a method for the production of a calcium phosphate product. It also relates to an installation for the production of the calcium phosphate product.

According to one aspect of the invention, broadly, there is provided a method for the production of condensed molasses solubles-enriched calcium phosphate, the method including the steps of reacting, in an exothermic reaction, a predetermined amount of a calcium oxide-containing product with a pre-determined amount of an aqueous solution of phosphoric acid and a predetermined amount of condensed molasses solubles to produce a reaction mixture containing calcium phosphate and condensed molasses solubles;

allowing the heat produced in the exothermic reaction to evaporate at least a part of the water present in the reaction mixture; and isolating the condensed molasses solubles-enriched calcium phosphate in loose granular form having a water content of 0–15% (mass/mass).

By "loose granular form" is meant a product having a particle size ranging between about 3 mm and a powdery material. If the particle size is much larger than 3 mm the product may optionally be crushed to produce a desired particle size.

Condensed molasses solubles-enriched calcium phosphate in loose granular form, having a water content of 0–15% (mass/mass) is referred to in the remainder of this specification, as condensed molasses solubles-enriched calcium phosphate as defined.

"Condensed molasses solubles" is referred to in places in the remainder of this specification, for brevity, as "CMS" and is a product produced from the fermentation of molasses to produce ethanol. It is a syrupy substance which contains about 45% water and has a solids content of 550 g/kg (55%). It is available in South Africa from National Chemical Products, A Division of Sentrachem Limited. It is described in a trade pamphlet entitled "CMS" from National Chemical Products, A division of Sentrachem Limited, and the contents are incorporated by reference herein.

The term calcium phosphate is meant to include any calcium phosphate eg monocalcium phosphate, dicalcium phosphate and tricalcium phosphate and mixtures thereof.

Preferably, the method will include utilizing the heat produced in the exothermic reaction to drive off a major part or most of the water to produce the condensed molasses solubles-enriched calcium phosphate as defined.

The calcium oxide containing product may be unslaked lime and the method may include the steps of rapidly dispersing unslaked lime (CaO) and CMS in the aqueous solution of phosphoric acid in a mixing zone to form a generally homogeneous reaction mixture and allowing reaction between the unslaked lime and the acid in the reaction mixture to proceed until the reaction mixture reaches a predetermined temperature;

rapidly transferring the reaction mixture to a reaction zone when it has reached the predetermined temperature;

allowing the reaction to proceed essentially to completion in the reaction zone to form a mixture containing calcium phosphate and CMS; and isolating the CMS-enriched calcium phosphate product formed.

Thus, the reaction proceeds partly in the mixing zone and partly in the reaction zone. The aqueous solution is provided largely by the water present in the CMS. Additional water may, however, be added to further dilute the phosphoric acid.

Typically, the predetermined amounts of the aqueous solution of phosphoric acid, the calcium oxide containing product, e.g. the unslaked lime and the CMS are selected in a proportion to produce CMS-enriched calcium phosphate having a total phosphorus content of about 10–18% (mass/mass), a total calcium content of about 8,5–32,4% (mass/mass), and a Ca:P ratio (mass/mass) of between 1,8–1 and 0,85:1.

By varying the relative proportions of unslaked lime, phosphoric acid and CMS used, it is possible to produce CMS-enriched calcium phosphate having a pre-determined P and Ca content.

The predetermined amount of the aqueous solution of phosphoric acid may be produced by admixing a predetermined amount of concentrated phosphoric acid, having a $P_2O_5$ content of about 55–62% $P_2O_5$, with water.

The predetermined amounts of concentrated phosphoric acid, calcium oxide-containing product, condensed molasses solubles and water may be selected so that their mass ratio in the reaction mixture is 32–45% (mass/mass):15–29% (mass/mass):22–36 % (mass/mass):5–10% (mass/mass).

For example, according to pilot plant tests carried out by the Applicant, in order to produce 1 kg of a CMS-enriched calcium phosphate containing approximately 12% P and approximately 20% Ca, from phosphoric acid containing 57% $P_2O_5$, unslaked lime (90% CaO) containing 64,3% Ca and CMS, requires about 482 g (283 ml) $H_3PO_4$, about 311 g unslaked lime, about 405 g (311 ml) CMS and about 100 ml water. Similarly, to produce 1 kg of a CMS-enriched calcium phosphate containing approximately 16% P and approximately 18% Ca, requires about 645 g (379 ml) $H_3PO_4$, about 280 g unslaked lime, about 384 g (294 ml) CMS and about 100 ml water. Naturally, by varying the quantities of phosphoric acid, unslaked lime and CMS, a CMS-enriched calcium phosphate product having other relative proportions of P and Ca can be produced.

The phosphoric acid is typically ortho-phosphoric acid.

The method may include the prior step of admixing the predetermined amount of concentrated phosphoric acid with water in order to dilute the phosphoric acid to produce the aqueous solution of phosphoric acid. The method may, instead, include the prior step of admixing the predetermined amount of the condensed molasses solubles with the concentrated phosphoric acid and, optionally, adding additional water.

By concentrated phosphoric acid is meant phosphoric acid having a concentration of about 55–62% ($P_2O_5$ equivalent) i.e. about 73–84% $H_3PO_4$ and, preferably, about 55–61% ($P_2O_5$ equivalent). The volume of water admixed with the concentrated phosphoric acid together with the water present in the CMS will be such as to produce an aqueous phosphoric acid solution in the mixing zone having a concentration which is such as to produce a CMS-enriched calcium phosphate having a desired product analysis.

The reactivity of the unslaked lime, which is commercially available from different sources, can vary, as is described in further detail below, and the concentration of the phosphoric acid may, accordingly, be adjusted, by routine experimentation, in accordance with the reactivity of the unslaked lime.

Similarly, the amount of CMS may be varied in accordance with the amount of CMS required in the CMS-enriched calcium phosphate product.

The sequence of mixing the phosphoric acid, CMS and unslaked lime may be, as described above, by first admixing, i.e. diluting, the concentrated phosphoric acid with water, or by first admixing the CMS and phosphoric acid and, optionally, additional water and then adding the unslaked lime. The prior admixing step may be carried out over a period of about 4–8 seconds.

The method may, instead, include the step of simultaneously introducing the CMS, phosphoric acid and calcium oxide containing product and, optionally, additional water, into the mixing zone.

The concentrated phosphoric acid may contain about 0.04–0.10% fluorine and will typically contain about 0.07% fluorine.

The calcium oxide-containing product may contain about 85–95% CaO. The calcium oxide-containing product may be in particulate form, the particles having a size distribution such that 8–12% of the particles are retained on a sieve having a mesh size of 2–3 mm.

By the term unslaked lime is meant CaO which is produced by heating $CaCO_3$. The reaction is represented by the equation $CaCO_3 + \text{heat} \rightarrow CaO + CO_2$ and requires temperatures in excess of 960° C.

The unslaked lime is referred to hereinafter, for brevity, as lime. The lime thus may contain about 85–95% available CaO and typically contains about 90% available CaO, i.e. about 64.3% Ca. The total Ca, as CaO, may be about 90–95% and is typically about 92.5%. The size distribution of the lime will thus typically be such that about 8–12% e.g. 10% is retained on a 2.35 mm sieve.

The reaction between calcium oxide and phosphoric acid to produce calcium phosphate is set out below:

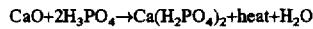

$$CaO + 2H_3PO_4 \rightarrow Ca(H_2PO_4)_2 + \text{heat} + H_2O$$

The batch size may be 1–1000 kg. By eg a 250 kg batch is meant a batch which contains sufficient lime, CMS and phosphoric acid to produce about 250 kg of CMS-enriched calcium phosphate.

The reaction between the lime and the aqueous phosphoric acid solution is exothermic and the temperature of a mixture of the lime and the aqueous phosphoric acid solution can rapidly rise to above 100° C. This has the following disadvantages. Above 100° C. the reaction mixture begins to boil and extensive frothing occurs. The viscosity of the reaction mixture also increases substantially at and above 100° C. This results in an increased discharge time which lengthens the batch time. It also results in a layer of solidified product remaining in the mixing zone which reduces the rate of heat exchange between the reaction mixture and the walls of the mixing vessel. The product which remains behind in the mixing zone also reacts with the following batch of phosphoric acid.

Furthermore, if the rate of addition of the lime to the aqueous phosphoric acid solution is too low, the reaction mixture may reach boiling point before all the lime has been added. Also, if the reaction mixture is not efficiently mixed to disperse the lime in the aqueous phosphoric acid, so that the reaction mixture rapidly becomes homogeneous, local overheating which can reach almost explosive proportions, can take place.

It is thus important to disperse the lime and the CMS in the aqueous phosphoric acid solution to bring about a homogeneous reaction mixture in the mixing zone as rapidly as possible, so that efficient reaction between the lime and the aqueous phosphoric acid can take place without localised overheating. In order to limit the extent of reaction which takes place in the mixing zone, and its attendant temperature increase, it is also important to transfer the homogeneous reaction mixture as rapidly as possible from the mixing zone to the reaction zone so that the reaction takes place largely in the reaction zone. Furthermore, in order to keep the batch cycle time as short as possible, the admixing, dispersing and transferring steps should be conducted as quickly as possible.

By batch cycle time is meant the pre-determined time between admixing the concentrated phosphoric acid, the CMS and the water and discharging the reaction mixture from the mixing zone. This time is selected, for a batch of a known mass, to ensure a predetermined production rate.

Thus, in order to prevent substantial reaction from taking place in the mixing zone, with an associated temperature rise and frothing, before transfer of the reaction mixture to the reaction zone, the rate of dispersing of the lime in the aqueous phosphoric acid solution to produce a generally homogeneous reaction mixture will preferably be as high as possible, and the time during which reaction between the lime and the phosphoric acid proceeds in the mixing zone will be short enough to prevent the reaction mixture from reaching a temperature above about 90° C. before the reaction mixture is transferred to the reaction zone. Preferably the reaction zone will be provided with a temperature monitoring device which is operable to trigger the transfer of the reaction mixture from the mixing zone to the reaction zone when the temperature in the zone reaches about 90° C.

Thus, the predetermined temperature may be about 85°–95° C.

To meet the above requirements, the lime is added to the aqueous phosphoric acid and CMS solution in as short a time as practicable. Alternatively, the lime, phosphoric acid, CMS and, optionally, additional water, are simultaneously added together in as short a time as practicable.

Thus, for example, to produce a 250 kg batch of CMS-enriched calcium phosphate containing 12% P and 20% Ca, about 77.8 kg lime will typically be added to a mixture produced from about 101 kg CMS (which as indicated above contains 55% solids and 45% water) and about 120.5 kg phosphoric acid over a period of about 4–8 seconds, preferably about 4 seconds. The time during which reaction between the lime and the aqueous phosphoric acid solution takes place in the reaction mixture before the reaction mixture reaches 90° C. and is transferred to the reaction zone will, on this scale, be about 7–10 seconds. The transferring step will also be carried out as quickly as practicable, generally over about 5–8 seconds, and will typically be carried out over about 7 seconds. The above times do not change substantially if the batch size is either increased or decreased by about 20%.

Thus, dispersing the calcium oxide-containing product in the aqueous solution of phosphoric acid may be carried out over a period of 4–8 seconds, the reaction may be allowed to proceed for a period of 7–10 seconds, and the reaction mixture may be transferred to the reaction zone over a period of 5–8 seconds.

The admixture of concentrated phosphoric acid and water is an exothermic process. Hence, the admixture of concentrated phosphoric acid and CMS (which as indicated above contains 45% water) is also an exothermic process. Thus, in order to keep the batch time as short as possible, admixing the concentrated phosphoric acid and the CMS will preferably also be carried out as rapidly as possible. The admixing time will also be kept as short as possible so that the mixture can be allowed to cool for as long as possible before admixture with the lime.

To meet the above requirement, as described above, the CMS and phosphoric acid may be mixed so that the concentrated phosphoric acid is diluted from about 55–62% ($P_2O_5$ equivalent) to the required concentration in about 4–8 seconds.

The overall batch time will thus be about 36–54 seconds, and is preferably about 45 seconds.

The mixing zone will preferably have a volume which is about 8–16 times larger than the volume of the reaction mixture to allow an expansion volume for boiling and frothing of the reaction mixture, in the event of a too high temperature in the mixing zone, thereby to minimise potential losses.

The method may include cooling the mixing zone during the admixing and dispersing steps. The cooling may be by rapid agitation of the reaction mixture in the mixing zone to achieve rapid heat dispersion through the reaction mixture and by providing a heat exchanger which removes heat from the mixing zone.

The invention extends to CMS-enriched calcium phosphate as defined whenever produced by the method as hereinabove described.

Naturally, lime having a lower level of available CaO may be used in the method. Reaction times and temperatures will then be correspondingly longer and lower and routine experimentation may be conducted in order to determine the optimum times and temperatures.

According to another aspect of the invention, there is provided an installation for the production of CMS-enriched calcium phosphate, the installation including a mixing zone and a separate reaction zone, dispensing means arranged to dispense a predetermined quantity of phosphoric acid, a predetermined quantity of a calcium oxide-containing product and a predetermined quantity of CMS into the mixing zone to produce a mixture;

dispersing means for rapidly dispersing the calcium oxide-containing product and CMS in the aqueous phosphoric acid solution in the mixing zone to form a generally homogeneous reaction mixture; and transferring means for rapidly transferring the reaction mixture from the mixing zone to the reaction zone when the reaction mixture has reached a predetermined temperature.

Typically, the dispensing means dispenses $H_3PO_4$, CaO and CMS in the proportions required to produce CMS-enriched calcium phosphate having a total phosphorus content of about 10–18% (m/m), a total calcium content of about 8.5–32.4% (m/m) and a Ca:P ratio of between about 1.8–1.0 and 0.85–1.0.

The dispensing means may be arranged to dispense, in addition, a predetermined quantity of water into the mixing zone.

The mixing zone may be a mixing vessel and the dispensing means may include hoppers from which, in use, the calcium oxide-containing product, the phosphoric acid, the water and the CMS are dispensed into the mixing vessel. The dispersing means may be an agitator for dispersing the unslaked lime and CMS in the aqueous acid solution. Preferably, the agitator will be configured for rapid agitation to provide rapid heat dispersion as well as optimum heat exchange. The hoppers may be provided with load cells for measuring the mass of the calcium oxide-containing product, the phosphoric acid, the water and the CMS in the hoppers.

The reaction zone may be in the form of two or more reaction vessels such as static dens.

The installation may be provided with cooling means for cooling the mixing zone. Thus, the mixing vessel may be provided with cooling means in the form of a water jacket for cooling the reaction mixture. The cooling jacket will preferably be configured so as to provide the largest practicable cooling area for efficient heat removal.

The installation may be provided with storage means for storing the unslaked lime, the phosphoric acid and the CMS.

The mixing vessel may be fabricated from stainless steel having a wall thickness of about 2 mm to ensure rapid heat transfer through the walls of the mixing vessel. The mixing vessel will preferably be cylindrical in shape with a relatively large cross-sectional area and a relatively wide base so that the ratio of wall/floor surface area to reaction mixture volume is relatively large so that optional heat transfer through the walls of the vessel can take place and so that expansion of the reaction mixture is allowed for if frothing occurs when a lime having a higher reactivity is used.

The transferring means may comprise at least one feed line which is provided with a valve for transferring the reaction mixture, under gravity, after the predetermined time, into the static dens.

The installation may be provided with automatic control means such as a process logic controller which operates to control all functions and to open the valve when the temperature in the mixing zone has reached a pre-determined value, eg 90° C.

The invention extends to CMS-enriched calcium phosphate as defined whenever produced using the installation as hereinbefore described.

BRIEF DESCRIPTION OF DRAWINGS

The invention will now be described, by way of example, with reference to the accompanying single figure which is a schematic representation of an installation for the production of CMS-enriched calcium phosphate in accordance with the invention, and to Table 1.

In the figure, reference numeral 10 generally indicates an installation for the production of CMS-enriched calcium phosphate.

The installation 10 includes two 230 $m^3$ concentrated phosphoric acid storage tanks 12, 14, a 230 $m^3$ CMS storage tank 15, a 230 $m^3$ unslaked lime storage silo 16, an unslaked lime duty silo 20, unslaked lime, water and concentrated phosphoric acid hoppers 22, 26, 28, a mixing zone in the form of a vessel 30, two static dens 34, 36 and a water reservoir 38. The hopper 28 also serves as a CMS hopper, as is described in further detail below. The vessel 30 is a cylindrical mixing vessel with a diameter of 1.5–1.6 m and a conical bottom with is about 24 cm deep.

An inlet feed flow line 42 leads from a feed pump 40 for feeding concentrated phosphoric acid into the phosphoric acid storage tank 12, and a connecting flow line 44 connects the tops of the storage tanks 12, 14. A phosphoric acid outlet flow line 48, which includes a valve 50, leads from the storage tank 12, and is linked to a second phosphoric acid outlet flow line 52, which includes a valve 54, leading from the storage tank 14. The outlet flow line 48 extends via a pump 58, located downstream of the line 52, to the phosphoric acid hopper 28, and is provided with a pneumatic valve 60. A flow line 62 connects the connecting flow line 44 between the tanks 12, 14 to the outlet flow line 48 downstream of the pump 58 and upstream of the valve 60.

A second inlet feed flow line 41 leads from a second feed pump 43 for feeding CMS into the storage tank 15. An outlet flow line 45, provided with a valve 47, a pump 49 downstream of the valve 47 and a valve 51 downstream of the pump 49 extends to the phosphoric acid hopper 28. A circulation line 53 provided with a valve 55 connects the outlet line 45 to the top of the tank 15 downstream of the pump 49.

The lime silo 16 is provided with a rotary valve feeder 66 for feeding lime into an auger 70 which transfers the lime to a bucket elevator 72 through which the lime is fed via a feed line 74 into the lime duty silo 20. A second rotary valve feeder 76 feeds the lime via a slide valve 78 and a feed line 80 into the lime hopper 22. The lime hopper 22 is mounted on load cells 23 so that the mass of lime in the hopper 72 can be measured. The lime hopper 22 is connected, via a second auger 88 and a feed line 90, to the reactor 30.

The water reservoir 38 is connected by a feed flow line 84 via a pump 86 to the water hopper 26. A flow line 92 leads from the water hopper 26 via a valve 94, a pump 96 and a pneumatic valve 98 to the mixing vessel 30. The water hopper 26 is also mounted on load cells (not shown) so that the mass of water in the hopper 26 can be measured.

A feed flow line 102 extends from the phosphoric acid hopper 28 via a pneumatic valve 104 to the mixing vessel 30. The phosphoric acid hopper 28 is provided with a level probe device 29 for monitoring the level of phosphoric acid in the hopper 28. The hopper 28 is, optionally, also mounted on load cells (not shown) so that the mass of acid and of CMS in the hopper can be measured.

A feed line 108 extends from the base of the mixing vessel 30 via a valve 110 to the static dens 34, 36. The mixing vessel 30 is provided with a water cooled jacket 120 which has a water inlet flow line 122 leading from the flow line 84 downstream of the pump 86 and a water outlet flow line 124 leading via a valve 126 to the water reservoir 38. The mixing vessel 30 is provided with a steam exhaust outlet 130 and an agitator 132.

In use, concentrated phosphoric acid having a concentration of about 55–62% ($P_2O_5$ equivalent) is fed from the storage tank 12 via the phosphoric acid outlet flow line 48, to the phosphoric acid hopper 28. Water is fed from the water reservoir 38 via the flow line 84 and the pump 86 into the water hopper 26. The CMS used was available from National Chemical Products, A Division of Sentrachem, and had a typical analysis as shown in Table 1 below.

TABLE 1

| TYPICAL ANALYSIS FQR CMS | |
|---|---|
| MOISTURE % | 45.0 |
| SOLIDS % | 55.0 |
| pH (20% SOLUTION) | 5.07 |
| ASH % | 17.7 |
| TOTAL REDUCING SUGAR % | 9.5 |
| FRUCTOSE % m/v | 0.68 |
| GLUCOSE % m/v | 0.26 |
| SUCROSE % m/v | 0.23 |
| NITROGEN % | 0.78 |
| CRUDE PROTEIN % | 4.88 |
| GLYCEROL % | 3.2 |
| FAT & FIBRE | 0 |
| VOLATILE FATTY ACIDS % | 0 |
| FATTY ACIDS ESTERS, PECTINS, GLUCOSIDES & POLYSACCHARIDES % | 0 |
| Ca % | 1.16 |
| K % | 5.57 |
| Mg % | 1.1 |
| Na ppm | 0.21 |
| Cl % | 3.43 |
| F ppm | 4.3 |
| Mn ppm | 60 |
| Cu ppm | 7 |
| Co ppm | 8 |
| Zn ppm | 45 |
| Fe ppm | 240 |
| S % | 0 |
| Se ppm | 0 |
| $SiO_2$ % | 0 |
| P as $P_2O_5$ % | 0.32 |
| P AS $PO_4$ % | 0.43 |
| $SO_4$ % | 3.25 |

TABLE 1-continued

| TYPICAL ANALYSIS FQR CMS | |
|---|---|
| ACETIC ACID % | 0.21 |
| LACTIC ACID % | 1.51 |
| CITRIC ACID % | 0.8 |
| pV ppm | — |
| YEAST CELLS (DEAD) | $5.2 \times 10^8$ cells/ml |
| TOTAL DIGESTABLE NUTRIENTS DRY BASIS | +40% |

CMS is also fed from the storage tank 15 via the flow line 45 and the pneumatic valve 51 into the hopper 28. Lime is fed from the lime silo 16 via the auger 70, the bucket elevator 72, and the feed line 74 into the lime duty silo 20. The lime is then fed via the rotary valve feeder 76, the slide valve 78 and the feed line 80 into the lime hopper 20. The formulation mass balance is calculated to allow for variations in raw material quality, as discussed in more detail below.

In a typical batch run, phosphoric acid is fed into the mixing vessel 30 and CMS is rapidly run into the mixing vessel 30 over a period of less than 8 seconds with vigorous stirring by the agitator 132 and with cooling water being pumped through the cooling jacket 120 at a rate of >20 m³/h, the quantities of phosphoric acid and CMS being selected to produce a CMS-enriched calcium phosphate product having a desired formulation. The resulting aqueous acidic solution, which is at a temperature of about 46°–65° C., is then agitated for 12–20 seconds during which time it cools to a temperature of about 30°–45° C. Lime in a quantity to produce the desired formulation is then fed via the auger 88, and the feed line 90, into the mixing vessel 30 with vigorous agitation by the agitator 132 over a period of less than 8 seconds to produce a homogeneous slurry and the resulting slurry is agitated for a further 7–9 seconds. The temperature of the reaction mixture rises to about 90° C. during this period.

In other embodiments of the invention, in which less reactive lime is used, the slurry is discharged at temperatures lower than 90° C. Water flow to the cooling jacket 120 may be reduced or shut off to increase this temperature.

The increase of the temperature in the mixing vessel 30 to 90° C. automatically triggers the discharge of the hot slurry from the mixing vessel via the feed line 108 and the valve 110 into the static dens 34, 36 over a period of about 8 seconds and it is left to react further in the static dens 34, 36. The temperature of the reacting slurry in the static dens rises to about 160°–170° C. over a period of about 40 minutes during which time most of the water present is driven off as steam. This temperature is also high enough to cause water of crystallisation of the mono-calcium phosphate to be driven off. The product, which is largely CMS-enriched mono-calcium phosphate as described above, is then removed from the dens 34, 36 after about 40 minutes to a storage area where it is matured for 2–10 days before being packed.

The CMS-enriched calcium phosphate product typically contains 10–18% (m/m) total phosphorus, 8,5–32,4% (m/m) calcium and not more than 0,13% (m/m) fluorine and is in loose granular form. As described above, the relative proportions of phosphorous and calcium in the product can be selectively varied by varying the amounts of phosphoric acid, lime and CMS used.

For example, to ensure a total phosphorus content of 18% (m/m), the relative amounts of lime and phosphoric acid are generally selected to target a phosphorus content of about 18% (m/m). The mass balance is based on averaged analytical values to allow for variations in raw material quality. Furthermore, a loss of about 3–7% is generally allowed for. To calculate the mass balance for the process, the average total water content of the CMS-enriched calcium phosphate product is selected to be from 0 to 15% (m/m). Generally the water content is selected to be as low as possible.

Any formulation for the CMS-enriched calcium phosphate product of the invention will depend on the physical quality of the two basic raw materials i.e. $H_3PO_4$ and CaO.

The dry basis analysis of $H_3PO_4$ will be affected by the degree of dilution through the presence of impurities in the form of different salts and it may vary considerably. The CaO concentration in the unslaked lime may also vary considerably.

A blank batch sheet, (Batch Sheet 1), together with two batch sheets showing the quantities of phosphoric acid, CMS and lime for the production of CMS-enriched calcium phosphate containing 12% P and 20% Ca (Batch Sheet 2) and 16% P and 18% Ca (Batch Sheet 3) are given below.

| BATCH SHEET 1 | |
|---|---|
| CMS ENRICHED CALCIUM PHOSPHATE | PRODUCT SPECIFICATION % P % Ca % $H_2O$ |
| (B) $H_3PO_4$ (% $P_2O_5$ + 2,29) = % 'P' | (G) Product $H_2O$ Analysed = % |
| (C) $H_3PO_4$ (Pure acid = 31,6% 'P' | (H) Impurities in $H_3PO_4$ = 7,0% |
| (D) CaO (Pure) = 71,4% Ca | (L) Product standard free $H_2O$ = % |
| (E) CaO (90%) = 64,3% Ca | (O) Standard loss alllowance = % |
| (F) CMS = 55% solids | |
| WET FORMULATION | DRY FORMULATION |
| (I) $H_3PO_4 \frac{\text{'P' SPEC}}{(B)} \times 100$ = parts | (I) $H_3PO_4 \frac{\text{'P' SPEC}}{(C)} \times 100 + (7\% \text{ of (I)})$ = % |
| (J) CaO $\frac{\text{'Ca' SPEC}}{(B)} \times 100$ = parts | (Q) 'Ca' spec + (10% of (J)) = % |
| (K) Free $H_2O$ = unknown | (P) Free $H_2O$ in (L) = % |
| (M) CMS $\frac{(N)}{(F)} \times 100$ = parts | (N) CMS 100 − ((R) + (Q) + (P)) = % |
| | 100,0% |
| PRODUCT ANALYSIS % 'P'    % 'Ca'    % $H_2O$ | |
| CORRECTED ANALYSIS (i) % 'P' ANALYSED + $\frac{100-(L)}{100-(G)}$ = % 'P' (CORRECTED TO STD) | |
| (ii) % 'Ca' ANALYSED × $\frac{100-(L)}{100-(G)}$ = % 'Ca' (CORRECTED TO STD) | |
| STANDARD FORMULATION: (i) % "Ca" ANALYSED × $\frac{100-(L)}{100-(G)}$  $\frac{\%P_2O_5 \text{ IN (B)}}{100}$ × 10 = KG $P_2O_5$/TE PRODUCT | |
| (ii) (J) × $\frac{(100+(O))}{100}$ × 10 = KR CaO/TE PRODUCT | |
| (iii) (M) × $\frac{(100+(O))}{100}$ × 10 = KR CMS/TE PRODUCT | |

| BATCH SHEET 2 | |
|---|---|
| CMS ENRICHED CALCIUM PHOSPHATE | PRODUCT SPECIFICATION 12% P, 20% Ca |
| (B) $H_3PO_4$ (CONTAINING 57% $P_2O_5$ = 24.89% P | (G) PRODUCT $H_2O$ ANALYSED = 3% |
| (C) $H_3PO_4$ (Pure) = 31,6% P | (H) IMPURITIES IN $H_3PO_4$ = 7% |
| (D) CaO (Pure) = 71.4% Ca | (L) STANDARD FREE WATER = 3% |
| (E) CaO (90%) = 64.3% Ca | (O) LOSS ALLOWANCE = 3% |
| (F) CMS = 55% SOLIDS | |
| WET FORMULATION | DRY FORMULATION |
| (I) $H_3PO_4 \frac{\text{P SPEC (12)}}{(B)(4.89)} \times 100 = 48,21$ PARTS | (R) $\frac{\text{P SPEC (12)}}{(C)(31.6)} \times 100 + 7\%$ OF (I) = 41,34% |
| (J) CaO $\frac{\text{Ca SPEC (20)}}{(E)(64.3)} \times 100 = 31,1$ PARTS | (Q) Ca SPEC (20) + 10% OF (J) (3.11) = 23,11% |
| (K) FREE WATER — | (P) FREE WATER = 3% |
| (M) CMS $\frac{(N)(32,55)}{(F)(0.55)} = 59,18$ PARTS | (N) CMS = 32.55% |
| | 100% |

-continued

BATCH SHEET 3

| CMS ENRICHED CALCIUM PHOSPHATE | PRODUCT SPECIFICATION 16% P, 18% Ca |
|---|---|
| (B) $H_3PO_4$ (CONTAINING 57% $P_2O_5$ = 24.89% P) | (G) PRODUCT $H_2O$ ANALYSED = 3% |
| (C) $H_3PO_4$ (Pure) = 31.6% P | (H) IMPURITIES IN $H_3PO_4$ = 7% |
| (D) CaO (Pure) = 71.4% Ca | (L) STANDARD FREE WATER = 3% |
| (E) CaO (90%) = 64.3% Ca | (O) LOSS ALLOWANCE = 3% |
| (F) CMS = 55% SOLIDS | |

| WET FORMULATION | DRY FORMULATION |
|---|---|
| (I) $H_3PO_4 \dfrac{\text{P SPEC (16)}}{\text{(B) (24.89)}} \times 100 = 64{,}26$ PARTS | (R) $\dfrac{\text{P SPEC (16)}}{\text{(C) (31.6)}} \times 100 + 7\%$ OF (I) = 55,09% |
| (J) CaO $\dfrac{\text{Ca SPEC (18)}}{\text{(E) (64.3)}} \times 100 = 28{,}0$ PARTS | (Q) Ca SPEC (18) + 10% OF (J)(2,8) = 20,8% |
| (K) FREE WATER — | (P) FREE WATER = 3% |
| (M) CMS $\dfrac{\text{(N) (21,16)}}{\text{(F) (0.55)}} = 38.38$ PARTS | (N) CMS = 21,1% |
| | 100% |

In Batch Sheet 1
B is the analytically measured % P in the phosphoric acid;
(C), (D), (E), (F) and (H) are standard values;
(G) is the analytically measured % water in the product;
(L) is the required % water content in the product;
(O) is the loss allowed in the process;
(I) and (J) are the quantities of $H_3PO_4$ and CaO required to produce a product having a required Ca and P content;
(K) is the water added to the reaction mixture and is determined by routine experimentation;
(R) and (Q) are the corresponding quantities of dry $H_3PO_4$ and CaO required to produce the product having the required Ca and P content;
(P) is the % water required in the product and is the same as (L);
(M) is the quantity of CMS required in the wet formulation and is obtained from the value of (N) which is given by (N) = 100 − [(R) + (Q) + (P)].
The loss allowance (O) is based on practical experience and is built into the above calculations to provide a standard for costing purposes.

The volume of water used for $H_3PO_4$ dilution derived both from added water, if any, and from water present in the CMS must be guided by the final cake temperature in the static dens 34, 36 in order to control water soluble P in the product of the invention.

Without being bound by theory, the Applicant believes that the following reactions are taking place simultaneously in the process of the invention:

1. $CaO + H_2O \rightarrow Ca(OH)_2$ (slaked lime)+heat
2. $Ca(OH)_2 + 2H_3PO_4 \rightarrow 2Ca(H_2PO_4)_2 \cdot 2H_2O$ (mono-calcium phosphate dihydrate)+heat
3. $Ca(H_2PO_4)_2 \cdot 2H_2O + CaO \rightarrow 2CaHPO_4 \cdot H_2O$ (dicalcium phosphate)+heat+$H_2O$
4. $2CaHPO_4 \cdot H_2O + CaO \rightarrow Ca_3(PO_4)_2$ (tricalcium phosphate) +heat+$H_2O$ also $CaO + 2H_3PO_4 \rightarrow Ca(H_2PO_4)_2 \cdot H_2O$ (mono-calcium phosphate monohydrate)

The progressive reaction phases from 1–4 require increasingly higher temperatures to support the reaction in each step. Thus, the progression from mono-calcium phosphate to dicalcium phosphate to tricalcium phosphate is dependent on the reaction temperature reached in the reaction zone (static dens), as well as the amount of Ca available. Excess water in the formulation allows for the loss of large quantities of latent energy through the emission of steam from the reactive mass in the reaction zone. The use of more water will result in the loss of more energy, thus preventing excessively high final cake temperature. The ideal is to use the maximum amount of water in the formulation, which is limited by the free moisture content of the product removed from the static dens not exceeding a predetermined value of between 0 and 15%. Thus, the final cake temperature in the reaction zone is dependent on the amount of water in the formulation. It can also be seen that a maximum yield of mono-calcium phosphate and hence a maximum amount of CMS-enriched mono-calcium phosphate will be formed at the minimum temperature attainable in the static dens. At higher temperatures CMS-enriched di- and tri-calcium phosphate will be favoured.

It is an advantage of the invention illustrated that, unlike prior art processes known to the Applicant, the process of the invention allows CMS-enriched calcium phosphate to be produced directly from $H_3PO_4$, CaO and CMS in loose granular form without the requirement and costs of an extra mixing and spray-drying step. A further important advantage of the invention is that the removal of water from the final product to produce a product having a pre-determined water content is achieved by using the heat of the reaction to drive off excess water. The installation of the invention described in particular for the production of CMS-enriched calcium phosphate is capable of producing about 15000 kg of CMS-enriched calcium phosphate per hour. The Applicant envisages that this rate may be increased to about 20000 kg per hour, or more, if a larger reactor and additional static dens are used. It is also an advantage of the invention illustrated that the process is relatively safe, and does not expose workers to substantial health risks. The process also does not create a substantial risk of environmental pollution. The equipment and the materials used in the process are of standard construction unlike the case in the production of calcium phosphate from $CaCO_3$ and sophisticated equipment, materials and skills are not required. The process is also not as energy-intensive as the $CaCO_3$ process. It is also an advantage of the invention illustrated that both control of the process and the maintenance of the equipment require a relatively low level of skill and process problems can generally usually be easily diagnosed and addressed. Furthermore, because of the standard nature of the equipment, the cost of maintenance of the equipment and capital expenditure in order to set up the installation are, accordingly, relatively low. It is a further advantage of the invention illustrated that, although relatively standard equipment is used, raw material proportioning can be accurately effected.

We claim:

1. A method for the production of condensed molasses solubles-enriched calcium phosphate, the method including the steps of reacting, in an exothermic reaction, a predetermined amount of calcium oxide-containing product with a predetermined amount of an aqueous solution of phosphoric acid and a predetermined amount of condensed molasses solubles to produce a reaction mixture containing calcium phosphate and condensed molasses solubles;

allowing the heat produced in the exothermic reaction to evaporate sufficient of the water present in the reaction mixture to produce condensed molasses solubles-enriched calcium phosphate in loose granular form having a water content of 0–15% (mass/mass); and isolating the condensed molasses solubles-enriched calcium phosphate in loose granular form.

2. A method as claimed in claim 1, in which the calcium oxide-containing product is unslaked lime, the method including the steps of rapidly dispersing the unslaked lime and condensed molasses solubles in the aqueous solution of phosphoric acid in a mixing zone to form a generally homogeneous reaction mixture and allowing reaction between the unslaked lime and the phosphoric acid in the reaction mixture to proceed until the reaction mixture reaches a predetermined temperature;

rapidly transferring the reaction mixture to a reaction zone when it has reached the predetermined temperature; and allowing the reaction to proceed essentially to completion in the reaction zone.

3. A method as claimed in claim 1, in which the predetermined amounts of the aqueous solution of phosphoric acid, the calcium oxide-containing product and the condensed molasses solubles are selected in a proportion to produce condensed molasses solubles-enriched calcium phosphate having a total phosphorus content of 10–18% (mass/mass), a total calcium content of 8,5–32,4% (mass/mass), and a Ca:P ratio (mass/mass) of between 1,8–1 and 0,85:1.

4. A method as claimed in claim 1, in which the predetermined amount of the aqueous solution of phosphoric acid is produced by admixing a predetermined amount of concentrated phosphoric acid, having a $P_2O_5$ equivalent of 55–62% $P_2O_5$, with water and the predetermined amounts of concentrated phosphoric acid, calcium oxide-containing product, condensed molasses solubles and water are selected so that their mass ratio in the reaction mixture is 32–45% (mass/mass):15–29% (mass/mass):22–36% (mass/mass):5–10% (mass/mass).

5. A method as claimed in claim 4, which includes the prior step of admixing the predetermined amount of concentrated phosphoric acid with water in order to produce the aqueous solution of phosphoric acid.

6. A method as claimed in claim 5, in which the prior admixing step is carried out over a period of 4–8 seconds.

7. A method as claimed in claim 4, which includes the prior step of admixing the predetermined amount of the condensed molasses solubles with the concentrated phosphoric acid and, optionally, adding additional water.

8. A method as claimed in claim 7, in which the prior admixing step is carried out over a period of 4–8 seconds.

9. A method as claimed in claim 2, which includes the step of simultaneously introducing the condensed molasses solubles, phosphoric acid and calcium oxide-containing product and, optionally, additional water into the mixing zone.

10. A method as claimed in claim 1, in which the calcium oxide-containing product contains 85–95% CaO.

11. A method as claimed in claim 1, in which the calcium oxide-containing product is in particulate form, the particles having a size distribution such that 8–12% of the particles are retained on a sieve having a mesh size of 2–3 mm.

12. A method as claimed in claim 2, in which the predetermined temperature is 85°–95° C.

13. A method as claimed in claim 2, in which dispersing the calcium oxide-containing product in the aqueous solution of phosphoric acid is carried out over a period of 4–8 seconds, the reaction is allowed to proceed for a period of 7–10 seconds, and the reaction mixture is transferred to the reaction zone over a period of 5–8 seconds.

14. A method as claimed in claim 2, in which the mixing zone has a volume which is 8–16 times larger than the volume of the reaction mixture.

15. A method as claimed in claim 2, which includes the step of cooling the mixing zone during the admixing and dispersing steps.

16. Condensed molasses solubles-enriched calcium phosphate, in loose granular form, whenever produced by a method as claimed in claim 1.

17. Condensed molasses solubles-enriched calcium phosphate, in loose granular form, whenever produced by a method as claimed in claim 2.

* * * * *